United States Patent [19]

Gomberg

[11] 4,140,601
[45] Feb. 20, 1979

[54] MULTI-STEP CHEMICAL AND RADIATION PROCESS

[75] Inventor: Henry J. Gomberg, Ann Arbor, Mich.

[73] Assignee: Texas Gas Transmission Corporation, Owensboro, Ky.

[21] Appl. No.: 667,610

[22] Filed: Mar. 16, 1976

Related U.S. Application Data

[63] Continuation-in-part of Ser. No. 416,998, Nov. 19, 1973, abandoned.

[51] Int. Cl.² .............................................. B01J 1/10
[52] U.S. Cl. .............................................. 204/157.1 H
[58] Field of Search ................................. 204/157.1 H

[56] References Cited

U.S. PATENT DOCUMENTS 3,378,446  4/1968  Whittlesey .............................. 176/1

OTHER PUBLICATIONS

Steinberg, Advances in Science & Technology, vol. 1, 1962, pp. 309, 312 & 313.

*Primary Examiner*—Howard S. Williams
*Attorney, Agent, or Firm*—Laurence R. Brown

[57] ABSTRACT

A process which utilizes radiation energy, preferably that obtained from a fusion reaction and which includes selecting starting chemical materials having at least two molecules such as calcium bromide and water which contain as a part thereof a desired product $H_2$, a by-product $O_2$ and which chemically form an active material HBr that may be dissociated by radiation. A two step process permits the radiolytically dissociated Br to react with residual molecules to form and recycle the starting material $CaBr_2$. A combination of thermochemical and radiolytic reactions such as available in nuclear reactions therefore produces a greater yield of a desired end product such as hydrogen, also producing a by-product such as oxygen from a low cost expendable source material such as water, and reforms the starting material. Also the process provides for convenient separation of the desired end products.

9 Claims, 2 Drawing Figures

MULTI-STEP CHEMICAL AND RADIATION PROCESS

This is a continuation-in-part of Ser. No. 416,998 filed Nov. 19, 1973, now abandoned in favor of this application.

This invention relates to a Multi-Step Chemical and Radiation Process and more particularly to the combining of radiolytic and chemical reactions in a particular sequence to produce and separate a desired final product.

It is an object of the present invention to provide a combination of processes, chemical and radiolytic, which increase the efficiency of the use of radiation energy.

BACKGROUND OF THE INVENTION

Radiation is currently available from several sources. Alpha, gamma, X ray and neutron generators are commercially available. Fission nuclear reactors are well known.

Much work is presently being done in fusion reaction achieving ignition and burn of fusion fuel such as, for example, deuterium-tritium in pellet form. While there are a number of different approaches to this problem, one of them includes the utilization of a source of energy from a laser and particular pellet configurations which will make it possible to achieve ignition and burn in a reaction chamber. Patents which illustrate generally the apparatus which can be used in this type of system are:

Whittlesey U.S. Pat. No. 3,378,446 — Apr. 16, 1968
Daiber U.S. Pat.No. 3,489,645 — Jan. 13, 1970
Hedstrom U.S. Pat. No. 3,762,992 — Oct. 2, 1973

An article in *Laser focus*, September 1975, pages 39 to 42 is a public acknowledgement setting forth evidence that fusion works to produce neutrons by means of thermonuclear reaction. Fuel pellets been ignited with laser energy to produce high density neutron radiation and alpha radiation at both KMS Fusion, Inc. and the Lawrence Livermore Laboratory.

It has been proposed to use energy from thermonuclear reactions for the dissociation of water to hydrogen and oxygen in one step. This is described in a copending application of Theodor Teichmann, Ser. No. 414,369, filed Nov 9, 1973 and also in the application of Gomberg and Teitel, Ser. No. 414,370, filed Nov. 9, 1973. The one-step process involves radiation dissociation caused by neutrons, alpha, or x radiation, involves exposing the water as a target molecule directly to radiation and heat from a fusion of fission source to produce the desired product. The use of radiation from thermonuclear fusion reactions has a significant advantage over the use of radiation from fission in such processes. When te fission process is used as the radiation source, materials must be exposed directly to the fission fragments in order to obtain effective energy transfer and this also requires that the material be exposed to uranium or plutonium fuel directly. In some instances, the use of uranium dust to be mixed with the reactants is recommended. (See *Advances in Nuclear Science & Technology*, Vol. 1, Edited by Henley and Kouts, Academic Press, 1962, P. 298.) The result is a rather severe contamination of the products by radioactive fission fragments and by the fuel particles themselves. Direct exposure is necessary since about 80 percent of the fission energy is contained in the fission fragments.

In thermonuclear fusion of D-T, 80 percent of the energy is released as fast neutrons and the remaining 20 percent of the energy is released as alpha and X rays. In the fusion reaction, the material to be processed may be exposed directly in the central reaction chamber to the radiation or may be exposed while being confined in a separate container because the high energy neutrons and heat may be passed out of the central reaction chamber. The latter condition is particularly appropriate for the high density neutron exposure from the fusion reaction since the neutrons have an effective penetration characteristic.

Thus, the use of fusion devices, with the resulting high energy neutrons, as well as alpha and X rays, allows for efficient interaction of the radiation with the reactants while limiting radioactivity problems to those caused by neutron activation. This difference alone is extremely significant in considering the use of thermonuclear reactors for chemonuclear processing.

OBJECTS AND BRIEF DESCRIPTION OF THE INVENTION

It is therefore an object of the present invention to utilize a combination process, chemical, thermal and radiolytic, which is particularly adapted for use with the fusion process and which greatly increases the efficiency in the use of radiation energy to produce desired output products. In addition, the process is relatively simple and the end products may be more readily separated by intermediate chemical reactions.

It is a further object to provide a system wherein an inexpensive raw material only is expendable in producing an output product and the more expensive chemicals used as original feed constituents may be completely recycled. The process can result in a chemically recyclable molecule reacting with the inexpensive raw material to produce a new radiosensitive molecule which is efficiently processed in the presence of radiation to form a principle product. The process also forms a by-product from the input raw material constituents.

Thus, for example, water as a raw material may be processed to produce hydrogen and oxygen in the presence of a recycled alkaline earth salt chemical reaction which produces a radiolytic sensitive hydrogen halide intermediate product from which the hydrogen is released and separated. The halide then reacts with the residue to reform the alkaline earth salt and the output by-product oxygen.

Other objects and features of the invention will be apparent in the following descrition and claims wherein the principles of the invention and the use thereof, together with the best mode presently contemplated for the practice of the invention, are set forth.

Drawings accompany the disclosure and the various views thereof may be briefly described as . . .

FIG. 1, a block diagram of a system for utilizing the process; and

FIG. 2, a simplified block diagram for a modified cycle.

DETAILED DESCRIPTION OF THE INVENTION

Figure 1:
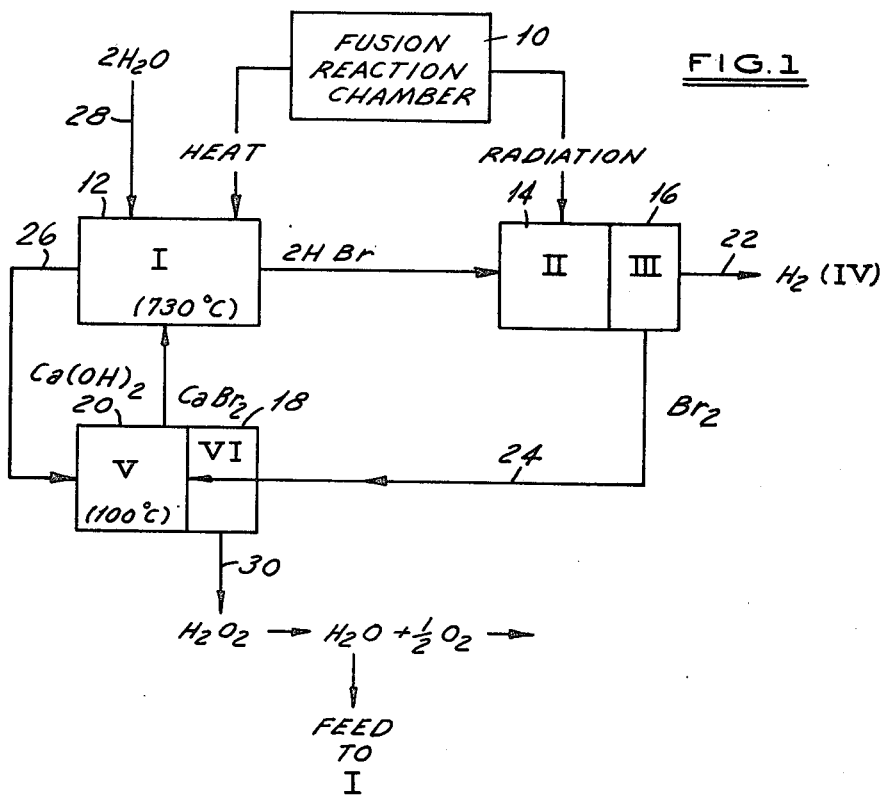

Molecular fragmentation by radiation or "radiolysis" is a known phenomenon. It can be used to form desirable or useful molecular species from feed materials containing larger molecules.

For example, decomposition of carbon dioxide by ionizing radiation from fission fragments, for example, is discussed by P. Harteck and S. Dondes in *The Journal of Chemical Physics* Vol 26, No. 6, June 1957, pp. 1727ff. Also a comprehensive discussion of Radiation Chemistry by Meyer Steinberg is set forth in *Advances in Nuclear Science and Technolody*, Vol. 1, 1962, Academic Press, pp. 252ff. This article expresses yields for various products in terms of G value and shows use of various types of radiation including fission fragments.

Examples are the formation of hydrogen and oxygen by radiolytic decomposition of water and also the formation of carbon monoxide and oxygen by radiolytic decomposition of carbon dioxide. However, the yield or "G" value for the radiolytic reaction of a one step process may be too low to be useful or economical. A commonly quoted G value for the yield of hydrogen molecules for radiation of clean liquid water by gamma rays is 0.5. (The G value is the number of product molecules formed per hundred electron volts of energy absorbed.)

The present invention involves the combination of processing steps of chemical reactions and radiolytic processes to improve the efficiency of formation of the desired product. Depending on the particular material used, a chemical reaction may originate the process followed by a radiolytic step, or an initial radiolytic step may produce molecules suitable for a chemical reaction to produce the final desired product. The multi-step process is so arranged that, except for secondary losses by escape, evaporation, transmutation and so forth, all the chemicals, except the original feed material such as water, are completely recycled. The original feed material is selected to provide the final desired product as is the case in the one step radiolytic process mentioned earlier.

In the present process of combining chemical and radiolytic steps, the feed products and the yield products may be the same as in the one step process. One important objective of the combined steps is to utilize the radiolytic step for exposure of a molecule which is specifically designed to have a high G value. Accordingly, when the chemical reaction is to be followed by the radiolytic process, the chemical reaction is used to create from a combination of the feed material and a chemically recyclable molecule a new radiosensitive molecule and an intermediate product. After radiolysis of the newly-created radiosensitive molecule, one fragment is collected as a desired product and the second fragment is reacted with the intermediate product to recreate both the original recyclable molecule and to provide a second output by-product.

As an example, an alkaline earth salt and an alkali hydroxide may be reacted to form an alkaline earth hydroxide and an alkali halide. The alkali halide is then subjected to radiolytic dissociation.

One example is the production of hydrogen and oxygen from water as the feed, and calcium bromide as the recyclable molecule.

The reaction proceeds as follows:

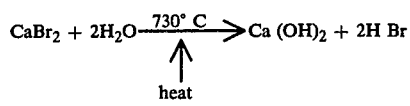  (a)

The heat is preferably a by-product of the fusion reaction, and this step may taken place outside the basic nuclear reactor.

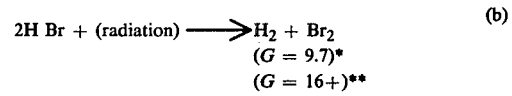

This process derives radiation, preferably from a fusion reaction, either in the central fusion chamber or in external chambers which receive neutron radiation, for example. The hydrogen is easily separated from the halogen by known processes.

  (c)

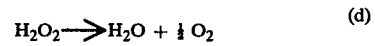  (d)

* Lee & Armstrng, Radiolysis of Gaseous Hydrogen Bromide. International J. Applied Radiation, Isotopes, Vol. 19, P. 586 (1968).
** For low pressure. Boyd et al. Low Pressure Anomalies in . . . Radiolysis of Gases. Rad. Research 40, P. 255 (1969).

It will be noted that the calcium bromide is conserved for recycling in this multiple step process and with the input of some heat and radiation, output products hydrogen and oxygen are formed. Thus, water, heat and ionizing radiation are the only consumable supplies. The hydrogen bromide molecule is known to be truly radiosensitive and is therefore a more efficient source of the hydrogen molecule derived in the radiolytic process than water.

In a second example, the process starts with a suitable radiation sensitive molecule and the products of radiolysis used in a chemical reaction. As an example, carbon dioxide is dissociated to carbon monoxide and oxygen. The carbon monoxide is then reacted with water to form carbon dioxide, hydrogen and oxygen.

The reaction proceeds as follows:

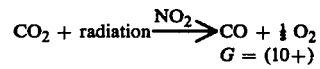

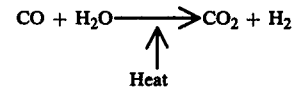

In the above two step reaction, we note that the carbon dioxide can be recycled. The only feed material, namely water, is consumed through conversion to hydrogen and oxygen. It will be appreciated that the heat needed for the thermochemical reactions (as well as the radiation energy) can be derived from the fusion reaction. Reference is made to the above mentioned art including *Advance in Nuclear Science & Technology*, Vol. 1, P. 262, where separation of $CO_2$ to derive CO and certain hydrocarbons has been reported in connection with radiation including fission energy sources.

A third example involves the use of water and chlorine.

The reaction proceeds as follows:

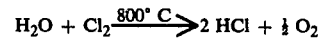

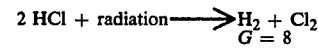

Copending applications, Ser. Nos. 416,997 and 417,000, filed Nov. 19, 1973, are directed to the specific examples above recited.

With reference to the first example above, an alkaline earth salt is reacted with water in a thermochemical reaction as previously indicated. With reference to FIG. 1, it will be seen that heat may be transferred to a vessel 12 directly from a fusion reaction chamber 10 or by means of a heat exchange medium or by heat exchange with hot products which have been exposed to radiation in a vessel 14 which may be referred to as a radiolysis chamber. A separation chamber 16 is provided adjacent the radiolysis chamber. A vessel 18 is connected to vessel 16 wherein the bromine gas may pass from chamber 16, and a reaction chamber 20 is provided to reform the alkaline earth hydroxide.

Thus, with reference to the diagram in FIG. 1, in chamber 12 a hydrolyzable alkaline earth salt is reacted with water by heating the mixture to form the alkaline earth hydroxide and the hydrogen halide. Examples of this reaction are:

$$CaBr_2 + 2H_2O \xrightarrow{730°} Ca(OH)_2 + 2HBr \quad (a)$$

$$CdBr_2 + 2H_2O \longrightarrow Cd(OH)_2 + 2HBr \quad (b)$$

$$CaCl_2 + 2H_2O \longrightarrow Ca(OH)_2 + 2HCl \quad (c)$$

The hydrogen halide is removed from vessel 12 and transferred to vessel 14 where it is subjected to radiation resulting from nuclear fusion in the reaction chamber 10. Thus, the hydrogen halide is exposed to neutrons, plus alpha rays and X rays. Dissociation of the gas takes place and the radiolytic product of hydrogen gas will exit through a suitable conduit 22 and the halide gas will be carried through a suitable conduit 24 to the chamber 18. Well-known processes of separation will take place in chamber 16 so that the halide gas can be separated from the principal product, hydrogen. The hydrogen is pumped away for storage and eventual use as a fuel, either in the pure state or as a manufactured hydrocarbon. The halide gas is reacted with the alkaline earth hydroxide resulting from the chemical reaction which has reached chamber 20 through a conduit 26. Thus, the hydrolyzable salt is reformed in the chamber 20 and can be suitably transferred back to chamber 12 to react with the fresh feed water which is entering through the conduit 28. The product water and oxygen from chamber 20 are pumped away through conduit 30. If desired, the product water can be returned to the conduit 28 and the oxygen may be recovered if desired for further use elsewhere.

Figure 2:
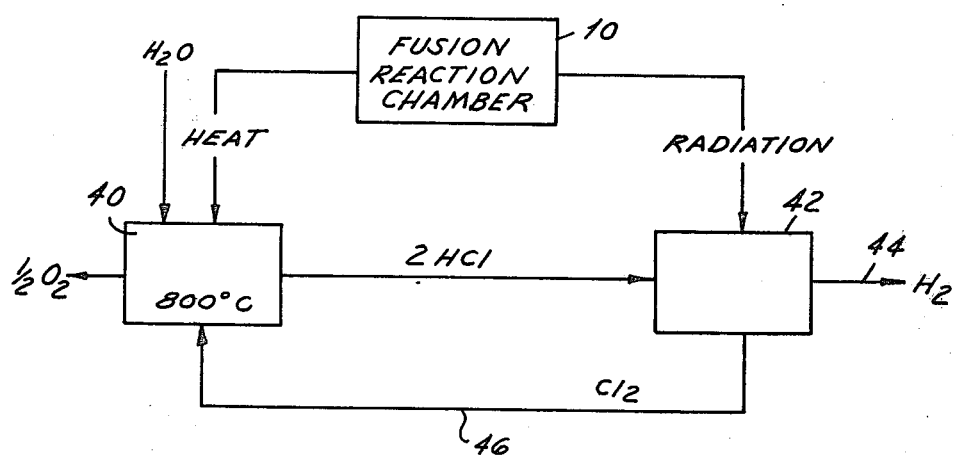

In FIG. 2, a system is shown for the reaction of the third example, above described, utilizing chlorine. Other halides might be used. The fusion reaction chamber 10 is positioned to transfer heat to the chemical reaction vessel 40 and to transfer radiation to the radiolytic chamber 42. In the cycle involved here, chlorine will be introduced into chamber 40 along with water, and under the influence of heat in the area of 800° C, (see *Chlorine: Its Manufacture, Properties and Uses,* J. S. Sconce, Editor in Chief, Van Nostrand Reinhold Co. 1962) there will be produced oxygen and hydrochloric acid which passes to the chamber 42 where it is subject to dissociation into hydrogen and chlorine. These gases are suitably separated in chamber 42 so that the hydrogen may pass out of the conduit 44 and chlorine may move through the conduit 46 back to the chemical reaction chamber 40.

The multi-step concept is applicable to many processes and products. The principal points are:

(a) Initially introduction, or creating, of a radiation sensitive molecule (b) By radiolysis, creation of an important chemical intermediate, or final product (c) Recycling of all chemicals except the feed material and desired final product.

The major objective of the combined process is to have radiolysis occur in a selected radiation sensitive molecule with a high G value.

It should be noted, however, that the fraction of the input radiation energy which is not utilized directly for radiolysis will be absorbed and converted to heat. The system can therefore be designed so that the driving high energy radiation and heat are both supplied from one and the same source, i.e., fast neutrons and other radiations from thermonuclear reaction.

Another feature of these processes, unlike direct radiolysis of water, where the hydrogen and oxygen emerge together, is that the hydrogen and oxygen are produced separately in different steps and in physically separated zones of the equipment. This reduces explosion hazard and makes purification of the final product easier.

What is claimed is:

1. A process of utilizing radiation and thermal energy which comprises:
   (a) selecting two starting material at least one having at least two separable portions, said at least one said material being expendible to produce a desired product and a by-product, and a halogen element in at least one of said portions which has a high G value to radiation; and
   (b) subjecting selected ones of the portions to simultaneous separate thermochemical and radiolytically induced chemical reactions including the subjection of said portion having a high G value to radiation to produce said product, said by-product, and a starting material.

2. A process as defined in claim 1 in which heat from a fusion reaction is utilized to drive said thermochemical reaction, and neutron radiation therefrom is utilized to drive radiolytically induced reaction.

3. A process of utilizing radiation and thermal energy which comprises:
   (a) selecting two starting materials having at least two separable portions each material being a compound with molecules which react to form two different compounds thereby to contain as a part of the two molecules reacting a desired product, a by-product, a molecule having a high G value to radiation and elements in each of the two molecules which can recombine to form one of said starting materials; and
   (b) utilizing a combination of thermochemical and radiolytically induced chemical reactions to form said two different compounds including the subjection of said molecule having a high G value to radiation in said radiolytically induced chemical reaction, to produce said product, and subjecting the molecules to said thermochemical reaction to produce said by-product, and a recombined starting material.

4. A process as defined in claim 3 in which heat from a fusion reaction is utilized to drive said thermochemical reaction, and neutron radiation therefrom is utilized to drive said radiolytically induced reaction.

5. The process defined in claim 3 wherein a reaction provides heat with alpha, neutron and X ray radiation, including the step of driving said thermochemical and radiolytic reactions from such reaction.

6. A process of utilizing radiation and thermal energy which comprises:
   (a) selecting an expendible feed material comprising separable parts including a desired product and by-product;
   (b) selecting a recyclable material having two separable parts which material can be reacted chemically with said feed material to form a new material containing the desired product and a first part of the recyclable material with a high G value to be used for product formation and to form a molecule containing the by-product and a second part of the original recyclable molecule;
   (c) subjecting the high G value material to radiation to separate by radiolysis the desired product and said first part of the recyclable material; and
   (d) removing the desired product and reacting the first part of the recyclable material with the molecule containing the second part of the recyclable molecule to reform the recyclable material and to liberate the by-product.

7. A process of utilizing radiation energy which comprises:
   (a) selecting an expendible feed material comprising elements including a desired product and by-product;
   (b) selecting a recyclable compound molecule which can be reacted chemically with said feed material to form a new molecule containing the desired product and a first part of the recyclable molecule having a high G value for product formation and to form a molecule containing the by-product and a second part of the original recyclable molecule;
   (c) subjecting the high G value molecule to radiation to separate by radiolysis the desired product and a first part of the recyclable molecule; and
   (d) removing the desired product and reacting the first part of the recyclable molecule with the molecule containing the second part of the recyclable molecule to reform the recyclable molecule and to liberate the by-product.

8. The process of deriving desired chemical products from input raw materials by subjection to radiation comprising the multiple steps of:
   feeding a raw material,
   chemically converting the raw material by reaction with a secnd material to obtain substance that upon exposure to radiation dissociates to produce a desired output product,
   exposing the substance to radiation, and
   separating the desired product produced by radiation.

9. The process defined in claim 8 wherein the residue of said substance after separation of the output product is chemically processed to form said second material.

* * * * *